(12) United States Patent
Soni et al.

(10) Patent No.: US 11,778,102 B2
(45) Date of Patent: Oct. 3, 2023

(54) VIDEO CONFERENCE COLLABORATION

(71) Applicant: Microsoft Technology Licensing, LLC, Redmond, WA (US)

(72) Inventors: Shahil Soni, Seattle, WA (US); Charles Yin-Che Lee, Mercer Island, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/711,473

(22) Filed: Apr. 1, 2022

(65) Prior Publication Data
US 2022/0353371 A1 Nov. 3, 2022

(30) Foreign Application Priority Data
Apr. 30, 2021 (LU) .................. LU500105

(51) Int. Cl.
*G06F 3/048* (2013.01)
*H04M 3/56* (2006.01)
*G10L 17/00* (2013.01)

(52) U.S. Cl.
CPC .......... *H04M 3/569* (2013.01); *G10L 17/00* (2013.01); *H04M 3/563* (2013.01)

(58) Field of Classification Search
CPC ........ H04M 3/569; H04M 3/563; G10L 17/00
See application file for complete search history.

(56) References Cited

U.S. PATENT DOCUMENTS

| | | |
|---|---|---|
| 9,100,539 B2 | 8/2015 | Sanso |
| 9,245,254 B2 | 1/2016 | Lord et al. |
| 9,485,284 B2 * | 11/2016 | Jones ............. H04L 12/1827 |
| 9,560,206 B2 | 1/2017 | Jones et al. |
| 10,587,753 B1 | 3/2020 | Ravichandran |

(Continued)

FOREIGN PATENT DOCUMENTS

WO 2019212920 A1 11/2019

OTHER PUBLICATIONS

"Use @Mentions to get Someone's Attention in Teams", Retrieved from: https://web.archive.org/web/20201021184026/https:/support.microsoft.com/en-us/office/use-mentions-to-get-someone-s-attention-in-teams-eb4f059d-320e-454e-b111-03361d4d6855, Oct. 21, 2020, 3 Pages.

(Continued)

*Primary Examiner* — David Phantana-angkool
(74) *Attorney, Agent, or Firm* — Schwegman Lundberg & Woessner, P.A.

(57) ABSTRACT

A system and method providing an accessibility tool that enhances a graphical user interface of an online meeting application is described. In one aspect, a computer-implemented method performed by an accessibility tool (128), the method includes accessing (802), in real-time, audio data of a session of an online meeting application (120), identifying (804) a target user, a speaking user, and a task based on the audio data, the speaking user indicating the task assigned to the target user in the audio data, generating (806) a message (318) that identifies the speaking user, the target user, and the task, the message (318) including textual content, and displaying (808) the message (318) in a chat pane (906) of a graphical user interface (902) of the online meeting application (120) during the session.

20 Claims, 10 Drawing Sheets

(56) References Cited

U.S. PATENT DOCUMENTS

| | | | |
|---|---|---|---|
| 11,417,343 B2* | 8/2022 | Cohen | G10L 17/20 |
| 11,463,499 B1* | 10/2022 | Fieldman | H04L 65/403 |
| 2009/0287483 A1* | 11/2009 | Co | G10L 15/22 |
| | | | 704/E15.001 |
| 2013/0290870 A1* | 10/2013 | Jones | H04L 12/1822 |
| | | | 715/753 |
| 2013/0298040 A1* | 11/2013 | Jones | H04M 3/563 |
| | | | 715/753 |
| 2014/0040777 A1* | 2/2014 | Jones | H04L 65/403 |
| | | | 715/753 |
| 2014/0219434 A1 | 8/2014 | Youel et al. | |
| 2015/0030150 A1* | 1/2015 | Jones | H04M 7/0039 |
| | | | 379/204.01 |
| 2015/0356836 A1 | 12/2015 | Schlesinger et al. | |
| 2018/0101281 A1* | 4/2018 | Nelson | G06F 3/0482 |
| 2018/0233135 A1* | 8/2018 | Talwar | G10L 15/063 |
| 2019/0075142 A1* | 3/2019 | Yoon | H04L 65/403 |
| 2019/0108493 A1* | 4/2019 | Nelson | G06Q 10/1095 |
| 2019/0273767 A1* | 9/2019 | Nelson | H04M 7/0027 |
| 2019/0318321 A1 | 10/2019 | Lopez Venegas et al. | |
| 2020/0005248 A1* | 1/2020 | Gerzi | G06Q 10/1097 |
| 2020/0043479 A1 | 2/2020 | Mont-reynaud et al. | |
| 2021/0266407 A1* | 8/2021 | Burton | G06Q 30/016 |
| 2021/0306457 A1* | 9/2021 | Krishnan | G06F 40/30 |
| 2022/0230116 A1* | 7/2022 | Dubey | G06Q 10/06398 |
| 2022/0319535 A1* | 10/2022 | Chawla | G10L 17/02 |
| 2022/0329934 A1* | 10/2022 | Feng | H04R 29/002 |
| 2022/0353309 A1* | 11/2022 | Grover | H04L 65/4015 |
| 2022/0353371 A1* | 11/2022 | Soni | H04M 3/569 |
| 2022/0385758 A1* | 12/2022 | Tadesse | H04M 3/568 |
| 2022/0394008 A1* | 12/2022 | Sundaram | H04L 51/23 |

OTHER PUBLICATIONS

"Search Report and Written Opinion Issued in Luxembourg Patent Application No. LU500105", dated Jan. 24, 2022, 11 Pages.

* cited by examiner

VIDEO CONFERENCE COLLABORATION

PRIORITY CLAIM

This patent application claims the benefit of priority, under 35 U.S.C. Section 119 to Luxembourg Application Number LU500105, Filed Apr. 30, 2021, entitled "Video Conference Collaboration", which is hereby incorporated by reference in its entirety.

TECHNICAL FIELD

The subject matter disclosed herein generally relates to a computer-implemented method that provides accessibility features of an application. Specifically, the present disclosure addresses systems and methods for analyzing audio data in an online meeting, providing accessibility data in a graphical user interface of the application based on the audio data.

BACKGROUND

Computer users heavily rely on communication tools such as online audio/video meetings, emails, and instant messaging applications. In particular, an online meeting application can present multiple sources of data (e.g., video data, audio data, and text chat) to attendees of the online meeting. As such, some attendees may have difficulties in following conversation in online meetings where both video/audio and text chat are available. Because there is more than one stream of conversation, it can be challenging for attendees to follow the different streams.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
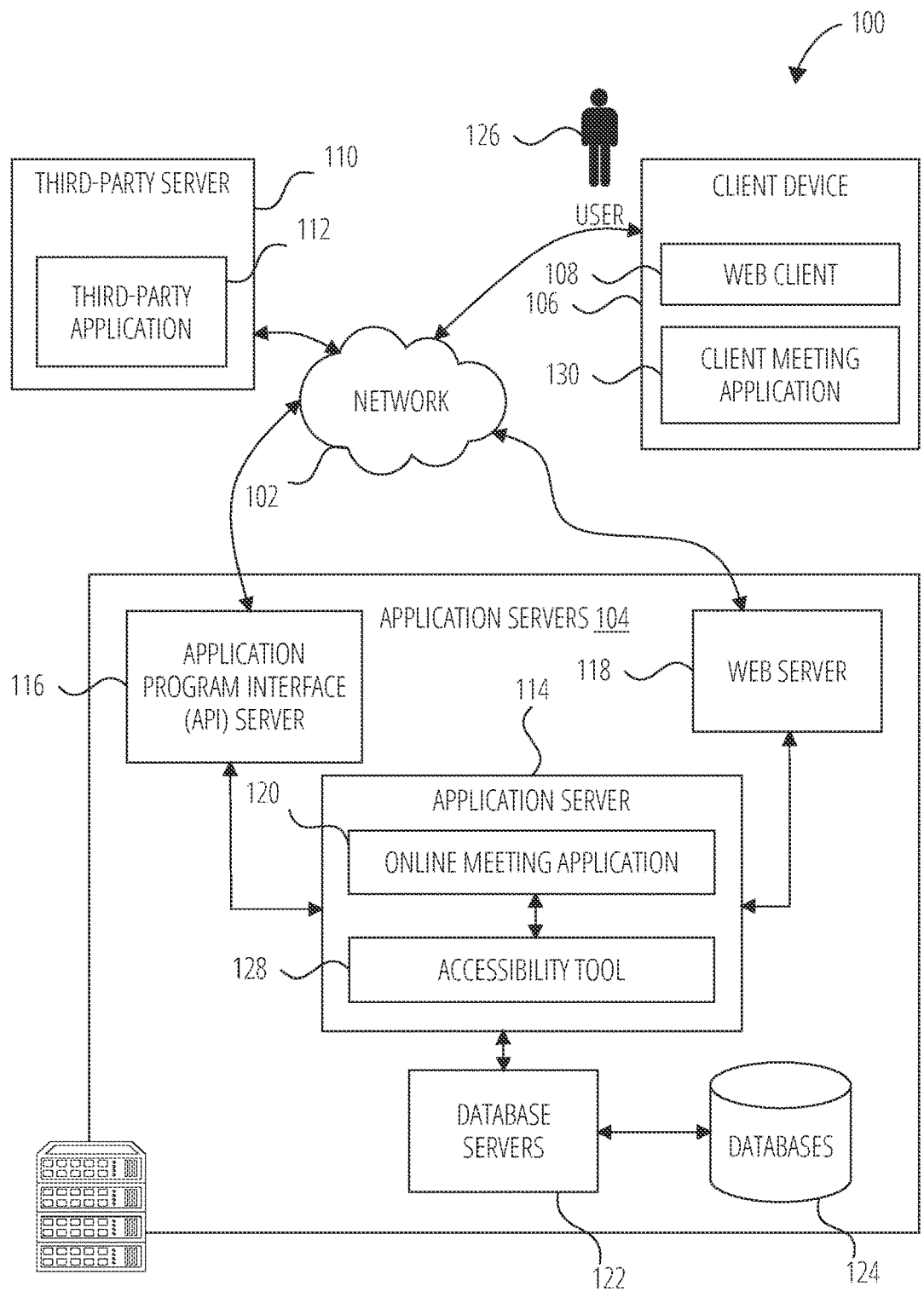
FIG. 1 is a diagrammatic representation of a networked environment in which the present disclosure is deployed, in accordance with some example embodiments.

The description that follows describes systems, methods, techniques, instruction sequences, and computing machine program products that illustrate example embodiments of the present subject matter. In the following description, for purposes of explanation, numerous specific details are set forth in order to provide an understanding of various embodiments of the present subject matter. It will be evident, however, to those skilled in the art, that embodiments of the present subject matter may be practiced without some or other of these specific details. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

The "online meeting application" is used herein to refer to a computer-operated application or platform that enables different computer users to communicate with attendees of a meeting in real-time, or near real-time. Non-limiting examples of the online meeting application include: a screen share application that enables users to share in real-time displayed graphical user interface (GUI), content, or document, a video conference application that enables attendees of the meeting to view a live video feed from the client devices of the attendees. The online meeting application enables users to communicate via video or audio with each other in or near real-time. A graphical user interface of the online meeting application can include a first pane adjacent to a second pane. The first pane displays a video stream. The second pane displays in real-time messages exchanged between attendees of the session. The second pane does not include an audio transcription of audio stream of the session.

The term "invitee" is used herein to refer to a user that has been invited to a session or meeting facilitated with the online meeting application. The invitee may have or may have not joined or attended the session. The invitee can also include an organizer of the meeting.

The term "attendee" is used herein to refer to a user that has been invited to a session or meeting facilitated with the online meeting application. The attendee is attending or has attended the session.

The term "communication application" is used herein to refer to a computer-operated application or platform that enables different computer users to communicate with each other. Non-limiting examples of the message application include: an email application that enables users to read and write emails, a chat/text/message application that enables a user to send and receive short messages to and from other users, and a social media application that enables a user to communicate with other groups of users.

The term "accessibility tool" is used herein to refer to a computer-implemented application that operates on a computing device. The accessibility tool performs or operates an algorithm corresponding to a process (e.g., capture audio, identify meeting attributes, analyze the audio data, determine attendees, generate a message, display the message in a GUI portion of the online meeting application). The process identifies a series of sequential tasks that are performed or computed based on user-defined rules or conditions. In one example embodiment, the accessibility tool is distinct and separate from the online meeting application. For example, the online meeting application does not include the accessibility tool and operates independently from the process application, and vice-versa. In another example embodiment, the online meeting application includes the accessibility tool and operate on the same computing device or on different devices. Non-limiting examples of the accessibility tool include: an application that operates a process based on audio inputs from one of the attendee of an online meeting, an application that performs an algorithm based on conditions and inputs provided by attendee, an application that displays a graphical user interface (e.g., a message) based on data, user inputs, and results of an algorithm operation based on the data and user inputs. For example, the accessibility tool accesses audio data, meeting attributes, and a user directory from the online meeting application and performs the process. Examples of processes include performing an operation that requires initial input, provides an intermediary output to a user (e.g., @Bob, give us an update), receives additional input from the user (e.g., "Bob is not responsible, it's Tim", and continues processing the process based on the additional input to generate a final result of the process (e.g., generate an enhanced chat message with @Tim, give us an update).

The present application describes an accessibility tool that operates with an online meeting application on a computing device. The accessibility tool enables a user of the online meeting application to follow different streams (e.g., video stream and chat stream) being presented during a session of the online meeting application. In one example, the accessibility tool detects (from the audio data) that an attendee of the session mentions another attendee in the video/audio call. The accessibility tool generates an entry in the chat/conversation pane of a graphical user interface of the online meeting application. The entry identifies the attendee (e.g., John) who mentioned the name of another attendee (e.g., Bob), and a task (e.g., comments/questions/remarks) assigned to Bob by John. One example of an entry is: "John: @Bob can you provide an update?"

In one example, the accessibility tool scans the list of attendees to identify a mentioned user (e.g., Bob). In another example, if there are more than two attendees with the same name (e.g., two attendees named "Bob"), the accessibility tool identifies the pertinent attendee from the context from the session. The context can be based on frequencies of communications between two attendees (e.g., John and Bob) during the session (e.g., John and Bob messaging each other in the chat pane) and outside the session (e.g., John and Bob emailing each other), a user profile or relationship between John and Bob (e.g., coworkers in a same group or working on a same project). Those of ordinary skill in the art will recognize that the context can also be determined using other analysis methods such as natural language processing, intent analysis using machine learning, and so forth.

In another example, the accessibility tool scans the list of attendees and determines that the attendee who has been mentioned in one of the streams has been invited to the meeting/session but is not present at the session. The accessibility tool generates a message that identifies John, Bob, and the task assigned to Bob. The accessibility tool requests a communication application (e.g., email or messaging application) to communicate the message to Bob during the session or after the session has ended.

In one example embodiment, a system and method providing an accessibility tool that enhances a graphical user interface of an online meeting application is described. In one aspect, a computer-implemented method performed by an accessibility tool, the method includes accessing, in real-time, audio data of a session of an online meeting application, identifying a target user, a speaking user, and a task based on the audio data, the speaking user indicating the task assigned to the target user in the audio data, generating a message that identifies the speaking user, the target user, and the task, the message including textual content, and displaying the message in a chat pane of a graphical user interface of the online meeting application during the session.

As a result, one or more of the methodologies described herein facilitate solving the technical problem of providing an enhanced visual signal in a chat pane of an online meeting application. Traditionally, the online meeting application simultaneously displays two streams of data (e.g., video/audio data, and chat data) in two distinct panes. The multiple panes and simultaneous data streams make it difficult for a user to follow independent conversations in both streams.

As such, one or more of the methodologies described herein may obviate a need for certain efforts or computing resources. Examples of such computing resources include processor cycles, network traffic, memory usage, data storage capacity, power consumption, network bandwidth, and cooling capacity. In one example, the present application describes a technical solution of detecting pertinent users of an online meeting, generating a message based on a context of the pertinent users and the audio data, and displaying the message in enhanced graphical user interface of the online meeting application to provide accessibility to users who may have difficulties following different data streams at the same time.

FIG. 1 is a diagrammatic representation of a network environment 100 in which some example embodiments of the present disclosure may be implemented or deployed. One or more application servers 104 provide server-side functionality via a network 102 to a networked user device, in the form of a client device 106. A user 126 operates the client device 106. FIG. 1 illustrates one client device 106. However, the application servers 104 may communicate with more than one client device. The client device 106 includes a web client 108 (e.g., a browser operating a web version of an application), a client meeting application 130 (e.g., a client-side enterprise communication application such as Microsoft Teams™) that is hosted and executed on the client device 106. The web client 108 communicates with an accessibility tool 128 via the programmatic interface provided by the Application Program Interface (API) server 116.

An Application Program Interface (API) server 116 and a web server 118 provide respective programmatic and web interfaces to application servers 104. A specific application server 114 hosts an online meeting application 120 and the accessibility tool 128. Each accessibility tool 128, online meeting application 120 include Components, modules and/or applications.

The online meeting application 120 includes a server-side communication application (e.g., a server-side enterprise communication application such as Microsoft Teams™) that is hosted and executed on the application server 114. The online meeting application 120 communicates with the client-side communication application (e.g., client meeting application 130) of each client device (e.g., client device 106) to receive audio/video/messages data from and provide audio/video/messages data to other client devices.

The online meeting application 120 enables the exchange of audio/video/messages between members of a group of users (e.g., attendees of a session of the online meeting application 120). For example, the online meeting application 120 enables attendees of the session to communicate with one another via video/audio/text. In one example, the online meeting application 120 includes a graphical user interface with two panes: an audio/video pane and a chat/messaging pane. The audio/video pane displays a live image captured from cameras of each client device and provides an audio signal from a microphone of each client device. The chat/messaging pane displays text messages from the attendees. Attendees can post entries in the chat/messaging pane independently from activities in the audio/video pane. Example Components of the online meeting application 120 are described further below with respect to FIG. 2.

The accessibility tool 128 includes an application that interfaces with the online meeting application 120. In one example, the accessibility tool 128 monitors audio data from the online meeting application 120 during a session and detects that an attendee (e.g., also referred to as a speaking user) has mentioned the name of another attendee (e.g., also referred to as a target user) following by a request or task (e.g., "please provide a status"). The accessibility tool 128 generates an entry in the chat pane based on the speaking user, the target user, and the task. In another example, the accessibility tool 128 monitors audio data from the online meeting application 120 during a session and detects that a speaking user has mentioned the name of a non-attending invitee (e.g., an invited user who is not attending the session) followed by a request or task. The accessibility tool 128 generates an entry in the chat pane based on the speaking user, the mentioned non-attending invitee, and the task. Example components of the accessibility tool 128 are described further below with respect to FIG. 3.

The application server 114 is shown to be communicatively coupled to database servers 122 that facilitates access to an information storage repository or databases 124. In one example embodiment, the databases 124 includes storage devices that store audio/video/chat data of a session provided by the online meeting application 120. The databases 124 can also include a directory of users of a group (e.g., the directory indicates a relationship between users of the group such as: user A works with user B on project X, user A is a manager of user B.

Additionally, a third-party application 112 executing on a third-party server 110, is shown as having programmatic access to the application server 114 via the programmatic interface provided by the Application Program Interface (API) server 116. For example, the third-party application 112, using information retrieved from the application server 114, may support one or more features or functions on a website hosted by the third party. For example, the third-party application 112 provides context analytics using machine learning or natural language processing to the accessibility tool 128. In another example, the third-party application 112 operates a lookup directory that identifies one or more invitees of a session/meeting that is pertinent to the task, accesses a directory of users from an enterprise associated with the invitees to determine a relationship between the invitees.

Figure 2:
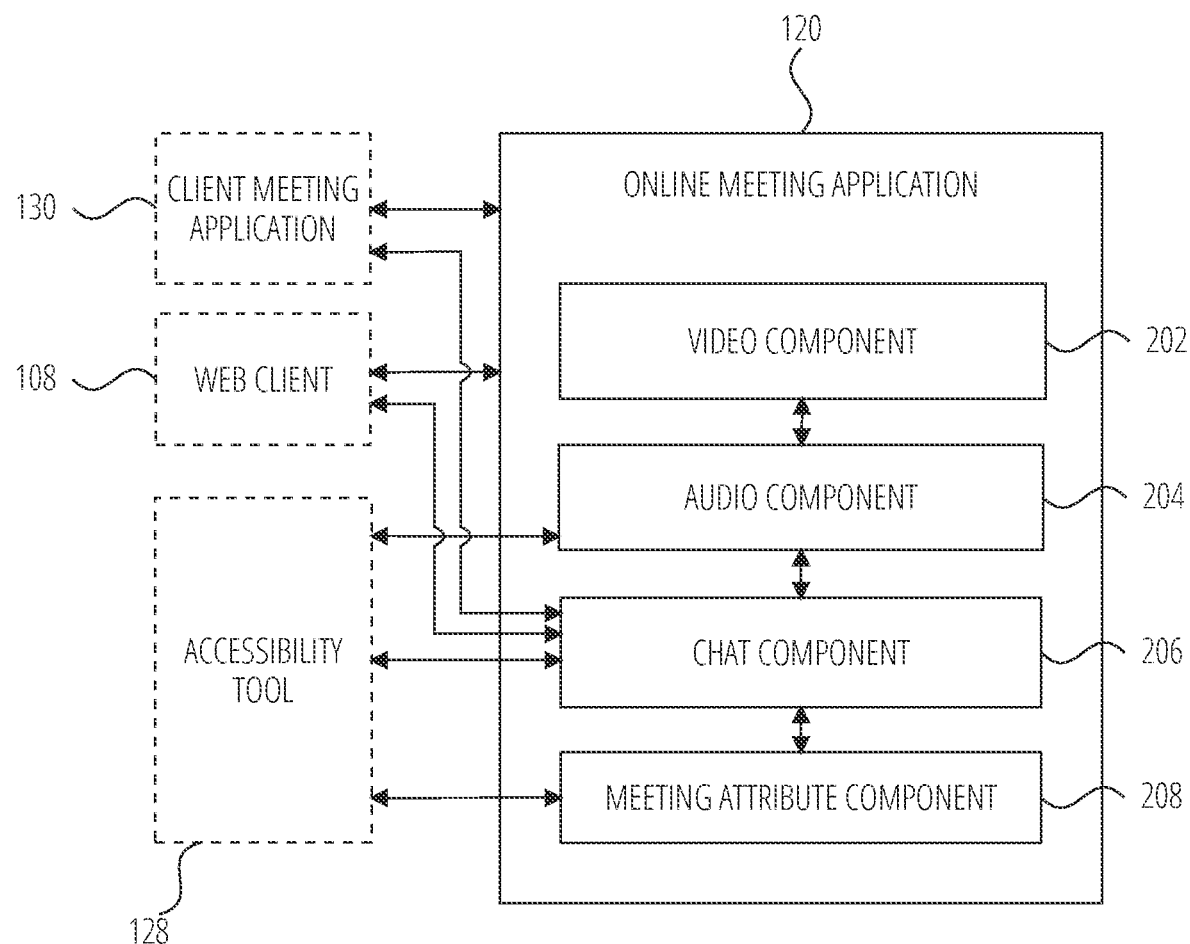
FIG. 2 is a block diagram illustrating an online meeting application in accordance with one example embodiment.

FIG. 2 is a block diagram illustrating an online meeting application 120 in accordance with one example embodiment. The online meeting application 120 includes a video component 202, an audio component 204, a chat component 206, and a meeting attribute component 208. The online meeting application 120 communicates with the online meeting application 120 and the web client 108.

The video component 202 accesses video data from each client device in communication with the online meeting application 120 during a session. In one example, the video component 202 provides a video feed from the attendees of the session in a first pane of a graphical user interface of the online meeting application 120, the client meeting application 130, or the web client 108.

The audio component 204 accesses audio data from each client device in communication with the online meeting application 120 during a session. In one example, the audio component 204 provides an audio feed from the attendees of the session at the client meeting application 130 of each client device of the attendees. In example, the audio component 204 communicates with the accessibility tool 128 and provides the audio data (also referred to as audio stream) of a session to the accessibility tool 128 for analysis.

The chat component 206 receives messages (also referred to as chat/text entries) from attendees of the session. In one example, the chat component 206 accesses the messages from the client meeting application 130 or the web client 108 of each client device of the attendees. The chat component 206 displays the messages in a chat pane of the graphical user interface of the online meeting application 120, the client meeting application 130, or the web client 108. In one example, each entry identifies an attendee and a message provided by the attendee.

The chat component 206 receives a message from the accessibility tool 128. The message identifies a speaker user, a target user, and a task/request. The chat component 206 displays the message from the chat component 206 in the chat pane of the graphical user interface of the online meeting application 120, the client meeting application 130, or the web client 108.

The meeting attribute component 208 accesses meeting attributes of a session enabled by the online meeting application 120. Example of meeting attributes include, but are not limited, to date and time of the session, invited users (also referred to as invitees), attending users (also referred to as attendees), session link, session meeting subject metadata, audio parameters, and video parameters. The meeting attribute component 208 provides the meeting attributes to the accessibility tool 128.

Figure 3:
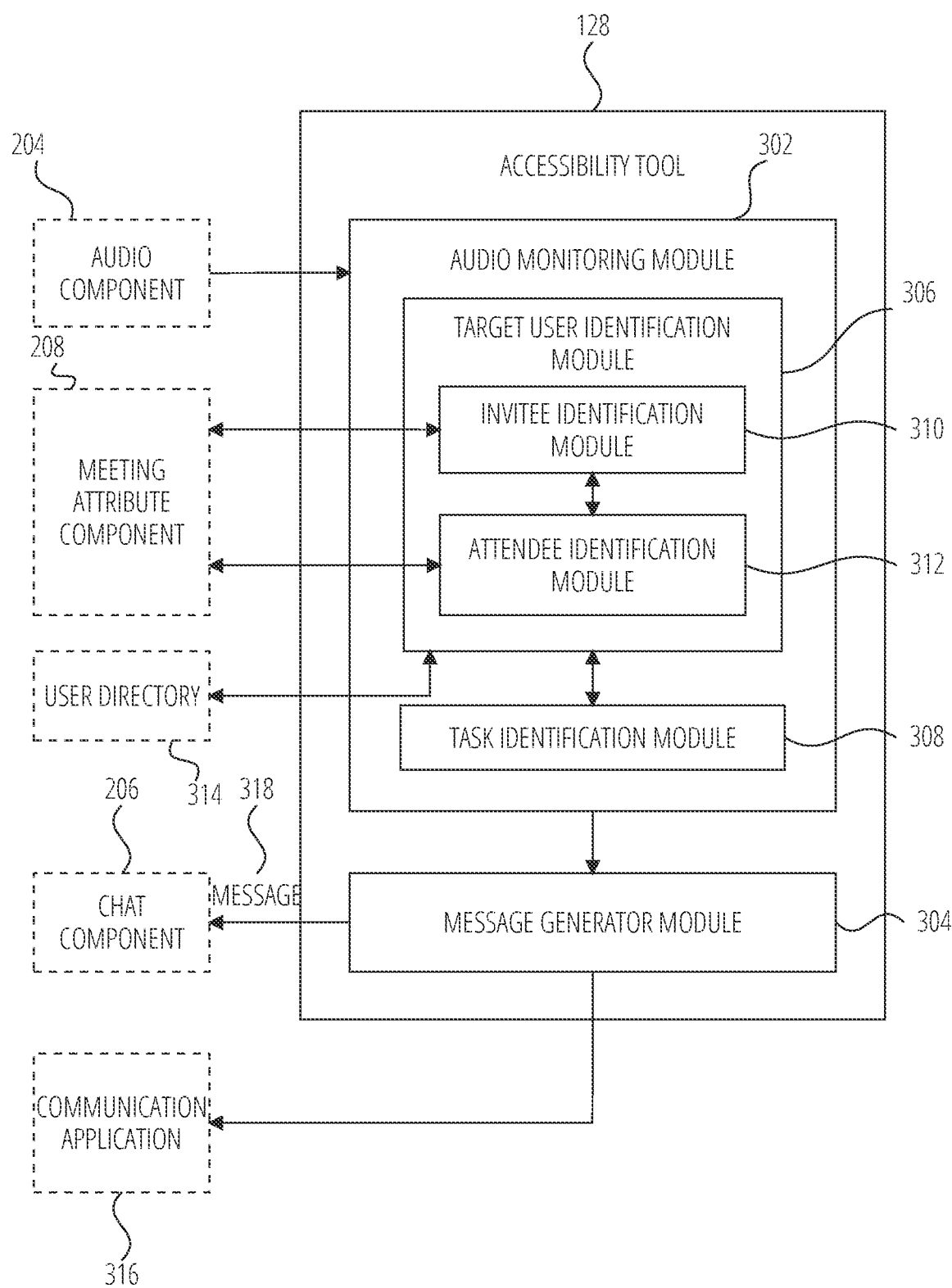
FIG. 3 is a block diagram illustrating an accessibility tool in accordance with one example embodiment.

FIG. 3 is a block diagram illustrating an online meeting application 120 in accordance with one example embodiment. The accessibility tool 128 includes an audio monitoring module 302, a message generator module 304, a target user identification module 306, a task identification module 308, an invitee identification module 310, an attendee identification module 312.

The audio monitoring module 302 accesses audio stream from the audio component 204. The audio stream is accessed at or near real-time. In another example, the audio monitoring module 302 accesses metadata from the online meeting application 120 that identifies an active (speaking) user of a session. An active user refers to a user that is currently speaking during the session. In one example, the audio monitoring module 302 includes a target user identification module 306 and a task identification module 308. In one example, the audio monitoring module 302 accesses a user directory 314 to access profiles of the users invited or attending the session.

The target user identification module 306 identifies a target user of a session. In other words, the target user identification module 306 identifies an active user (also referred to as speaking user) who mentioned the name of another attendee (e.g., the target user) or invitee of the session. In one example, the target user identification module 306 includes an invitee identification module 310 and an attendee identification module 312. The invitee identification module 310 accesses the meeting attributes from the meeting attribute component 208 and identifies which users of the online meeting application 120 are invitees. The attendee identification module 312 accesses the meeting attributes from the meeting attribute component 208 and identifies which users of the online meeting application 120 are attending the session. The target user identification module 306 searches a list of attendees of the session for the target user. In one example, the target user identification module 306 determines, based on the audio stream, that the mentioned name (e.g., the target user) identifies an attendee. In another example, the target user identification module 306 determines, based on the audio stream, that the mentioned name identifies a user that has been invited (e.g., an invitee) but is not an attendee of the session. In another example, the target user identification module 306 determines, based on the audio stream, that the mentioned name identifies a non-invited user who is closely related to an attendee or an invitee. For example, the non-invited user may not be part of the list of invitees of a session. However, the non-invited user is closely related to an attendee of the session because the non-invited user and the attendee are part of a same team or work on a same project. Other signals such as whether other team members of the attendee and the non-invited user are part of the list of invitees or attendees. As such, the target user identification module 306 can identify users that have been mistakenly omitted from the list of invitees.

In some example embodiments, the target user identification module 306 searches a list of invitees of the session for the target user, where the target user is not part of the list of attendees. The target user identification module 306 can also access a user directory 314 to retrieve the profile of the attendees (e.g., attendee X is a manager of attendee Y).

In some example embodiments, the target user identification module 306 determines that there are two attendees (e.g., Bob1 and Bob2) with a same name (e.g., Bob) attending the session. The target user identification module 306 accesses the user directory 314 to determine a context of the request. For example, the target user identification module 306 determines that an attendee (e.g., John) is a manager of one of the attendee (e.g., Bob1). The target user identification module 306 determines based on the profile of the attendees (e.g., John and Bob1) that the target user is one of the attendee (e.g., Bob1). In another example, the target user identification module 306 identifies the target user based on other context such frequency of communications between the attendees (e.g., John, Bob1, and Bob2). For example, if John had 50 email exchanges with Bob1, and 5 email exchanges with Bob2 in the thirty days prior to the session, the target user identification module 306 identifies Bob1 as the target user.

The task identification module 308 identifies the task or request mentioned by the speaking user right after the speaking user mentions the target user name. For example, the task identification module 308 identifies "can you provide an update?" as the task/request based on the following transcribed audio stream: "Bob, can you provide an update." The task identification module 308 tags the request with the speaking user and the target user. In another example, the task identification module 308 uses machine learning to determine whether the content of the transcribed audio refers to a request. For example, the task identification module 308 determines that "Bob, this presentation looks good" does not refer to a task or a request. Those of ordinary skills in the art will recognize that other methods of analyzing the content of the transcribed audio data can be used. For example, the task identification module 308 can use predefined keyword/wakeword triggers (keyword that triggers a specific function of the accessibility tool 128), sentiment analysis, contextual analysis.

The message generator module 304 generates a message entry (e.g., a message 318) in the chat panel based on the speaking user, the target user, and the task. For example, the message generator module 304 accesses the chat component 206 of the online meeting application 120 and generates a display of the message entry in the chat panel. In one example embodiment, the message generator module 304 visually emphasizes the message to the attendees and generates a notification to the target user. The notification indicates that the target user has been mentioned in the session of the online meeting application 120. In another example, the message generator module 304 generates a notification alert on the client device of the target user or sends a message to the target user via a communication application 316. In another example, the message generator module 304 pins the message entry during the session so that the message entry remains static and visible in the chat panel during the session.

In another example embodiment, the target user identification module 306 detects that the target user has been invited to the session but is not on the list of attendees of the session. The target user identification module 306 flags a target user as a non-attendee status of an invitee to the message generator module 304. The message generator module 304 uses the communication application 316 to generate an email that includes the message entry. The communication application 316 sends the email to the client device of the target user. In another example, the message generator module 304 uses the communication application 316 to generate a chat message that includes the message entry. The communication application 316 sends the chat message to the client device of the target user.

Figure 4:
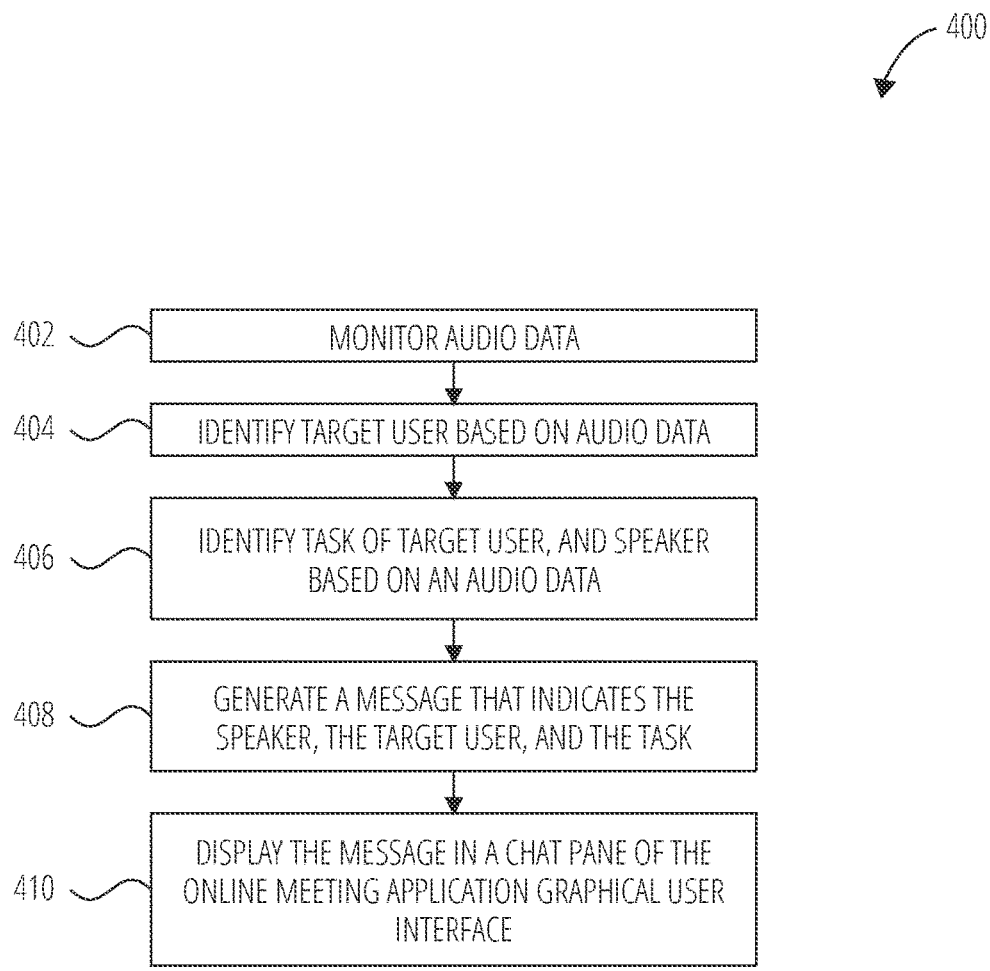
FIG. 4 is a flow diagram illustrating a method for displaying a message in accordance with one example embodiment.

FIG. 4 is a flow diagram illustrating a method 400 for displaying a message in accordance with one example embodiment. Operations in the method 400 may be performed by the accessibility tool 128, using Components (e.g., modules, engines) described above with respect to FIG. 3. Accordingly, the method 400 is described by way of example with reference to the accessibility tool 128. However, it shall be appreciated that at least some of the operations of the method 400 may be deployed on various other hardware configurations or be performed by similar Components residing elsewhere. For example, some of the operations may be performed at the client device 106 or at the third-party server 110.

In block 402, the audio monitoring module 302 monitors audio data. For example, the audio monitoring module 302 accesses transcribed audio data from the audio component 204 of a session enabled by the online meeting application 120.

In block 404, the target user identification module 306 identifies a target user based on the transcribed audio data and metadata associated with the transcribed audio data. For example, "Bob, please provide an update" is associated with a speaker metadata that identifies John as the source of the audio.

In block 406, the task identification module 308 identifies a task of the target user based on an audio data. For example, the task identification module 308 identifies "please provide an update" from the transcribed audio data "Bob, please provide an update" as a task/request. The task identification module 308 includes a voice recognition model combined with an intent model to determine that the content of an audio stream identifies a task. In another example, the task identification module 308 includes a machine learning Component that distinguishes task content from other content.

In block 408, the message generator module 304 generates a message that identifies the speaker, the target user, and the task. In block 410, the message generator module 304 displays the message in a chat pane of the online meeting application graphical user interface. In another example, the message generator module 304 communicates the message to the target user via an application (e.g., email application, messaging application) that is separate from the online meeting application 120.

Figure 5:
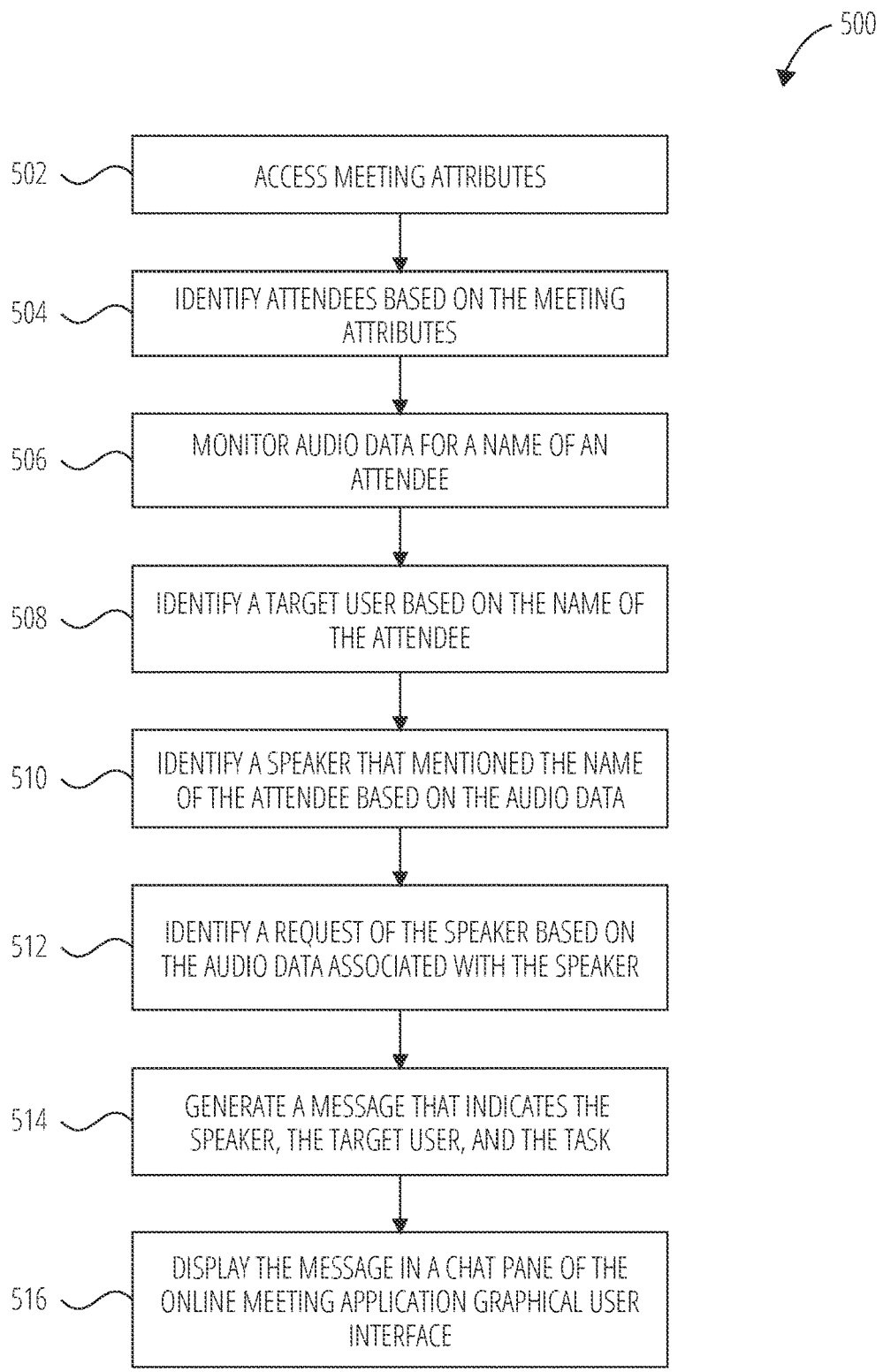
FIG. 5 is a flow diagram illustrating a method for displaying a message in accordance with one example embodiment.

FIG. 5 is a flow diagram illustrating a method for displaying a message in accordance with one example embodiment. Operations in the method 500 may be performed by the accessibility tool 128, using Components (e.g., modules, engines) described above with respect to FIG. 3. Accordingly, the method 500 is described by way of example with reference to the accessibility tool 128. However, it shall be appreciated that at least some of the operations of the method 500 may be deployed on various other hardware configurations or be performed by similar Components residing elsewhere. For example, some of the operations may be performed at the client device 106 or at the third-party server 110.

In block 502, the target user identification module 306 accesses meeting attributes of a session enabled by the online meeting application 120. For example, the target user identification module 306 accesses the meeting attribute component 208 to determine the meeting attributes.

In block 504, the attendee identification module 312 identifies attendees based on the meeting attributes. For example, the attendee identification module 312 determines which users are currently attending the session.

In block 506, the audio monitoring module 302 monitors audio data for a name of an attendee. For example, the audio monitoring module 302 detects the name of a user in an audio feed matches the name of a user in the list of users attending the session.

In block 508, the audio monitoring module 302 identifies a target user based on the name of the attendee. In block 510, the audio monitoring module 302 identifies a speaker that mentioned the name of the attendee based on the audio data. In one example, if the name identified by the speaker matches two or more names in the list of the attendees, the audio monitoring module 302 queries the target user to confirm which attendee the speaker intended to address.

In block 512, the task identification module 308 identifies a request of the speaker based on the audio data associated with the speaker. For example, the request includes "please provide an update."

In block 514, the message generator module 304 generates a message that indicates the speaker, the target user, and the task. In block 516, chat component 206 displays the message in a chat pane of the online meeting application graphical user interface. In one example, the message generator module 304 detects that the session has terminated or ended, and in response generates a report that identifies the speaking user, the target user, and the task. The message generator module 304 then communicates (e.g., via email) the report to the target user and/or the speaking user (e.g., or to another service application that monitors task activities of the target user and/or speaking user).

Figure 6:
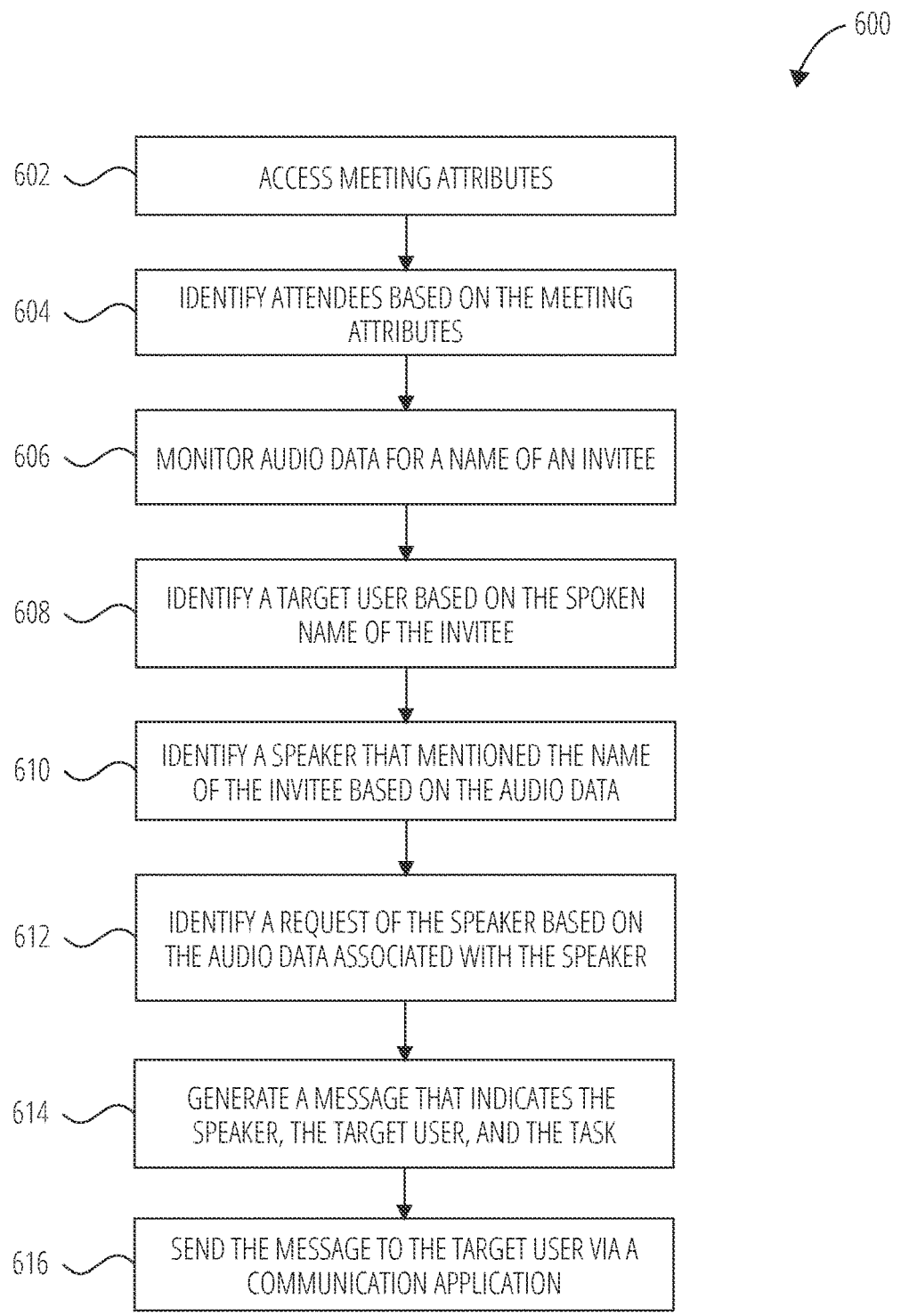
FIG. 6 is a flow diagram illustrating a method for generating a message in accordance with one example embodiment.

FIG. 6 is a flow diagram illustrating a method 600 for generating a message in accordance with one example embodiment. Operations in the method 600 may be performed by the accessibility tool 128, using Components (e.g., modules, engines) described above with respect to FIG. 3. Accordingly, the method 600 is described by way of example with reference to the accessibility tool 128. However, it shall be appreciated that at least some of the operations of the method 600 may be deployed on various other hardware configurations or be performed by similar Components residing elsewhere. For example, some of the operations may be performed at the client device 106 or at the third-party server 110.

In block 602, the target user identification module 306 accesses meeting attributes of a session enabled by the online meeting application 120. For example, the target user identification module 306 accesses the meeting attribute component 208 to determine the meeting attributes.

In block 604, the attendee identification module 312 identifies attendees based on the meeting attributes. For example, the attendee identification module 312 determines which invited users are currently attending the session, and which invited users have not joined or are not attending the session.

In block 606, the invitee identification module 310 monitors audio data for a name of an invitee. For example, the invitee identification module 310 detects the name of a user in an audio feed matches the name of a non-attending invitee. In block 608, the target user identification module 306 identifies the name of the non-attending invitee as the target user.

In block 610, the audio monitoring module 302 identifies a speaker that mentioned the name of the non-attending invitee based on the audio data. For example, the audio monitoring module 302 identifies the client device that transmits the signal (audio picked up by microphone).

In block 612, the task identification module 308 identifies a request of the speaker based on the audio data associated with the speaker. For example, the request includes "please provide an update."

In block 614, the message generator module 304 generates a message that indicates the speaker, the target user, and the task. In block 616, the message generator module 304 sends the message to the target user via a communication application.

Figure 7:
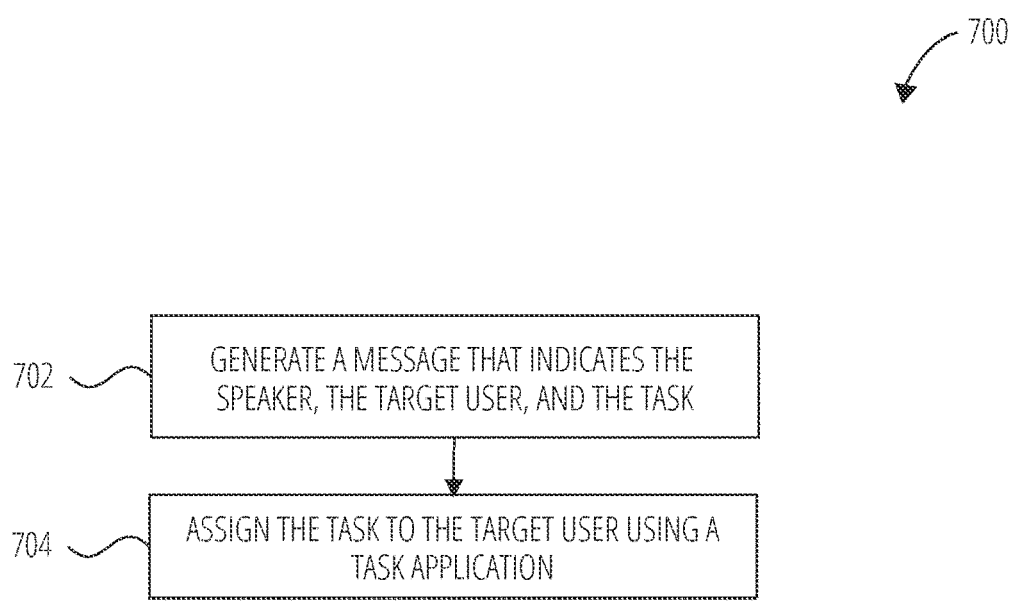
FIG. 7 is a flow diagram illustrating a method for assigning a task to a task application in accordance with one example embodiment.

FIG. 7 is a flow diagram illustrating a method for assigning a task to a task application in accordance with one example embodiment. Operations in the method 700 may be performed by the accessibility tool 128, using Components (e.g., modules, engines) described above with respect to FIG. 3. Accordingly, the method 700 is described by way of example with reference to the accessibility tool 128. However, it shall be appreciated that at least some of the operations of the method 700 may be deployed on various other hardware configurations or be performed by similar Components residing elsewhere. For example, some of the operations may be performed at the client device 106 or at the third-party server 110.

In block 702, the message generator module 304 generates a message that indicates the speaker, the target user, and the task. In block 704, the message generator module 304 assigns the task to the target user using a task application. For example, the message generator module 304 communicates with the task application registered to the target user and records the task with the task application.

Figure 8:
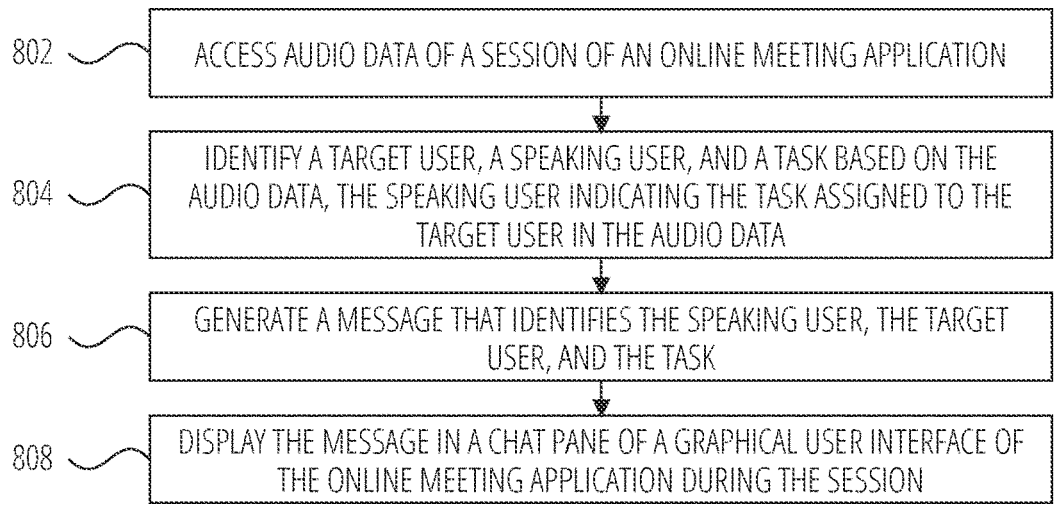
FIG. 8 illustrates a routine in accordance with one embodiment.

FIG. 8 illustrates a routine 800 in accordance with one embodiment. In block 802, routine 800 accesses audio data of a session of an online meeting application. In block 804, routine 800 identifies a target user, a speaking user, and a task based on the audio data, the speaking user indicating the task assigned to the target user in the audio data. In block 806, routine 800 generates a message that identifies the speaking user, the target user, and the task. In block 808, routine 800 displays the message in a chat pane of a graphical user interface of the online meeting application during the session.

Figure 9:
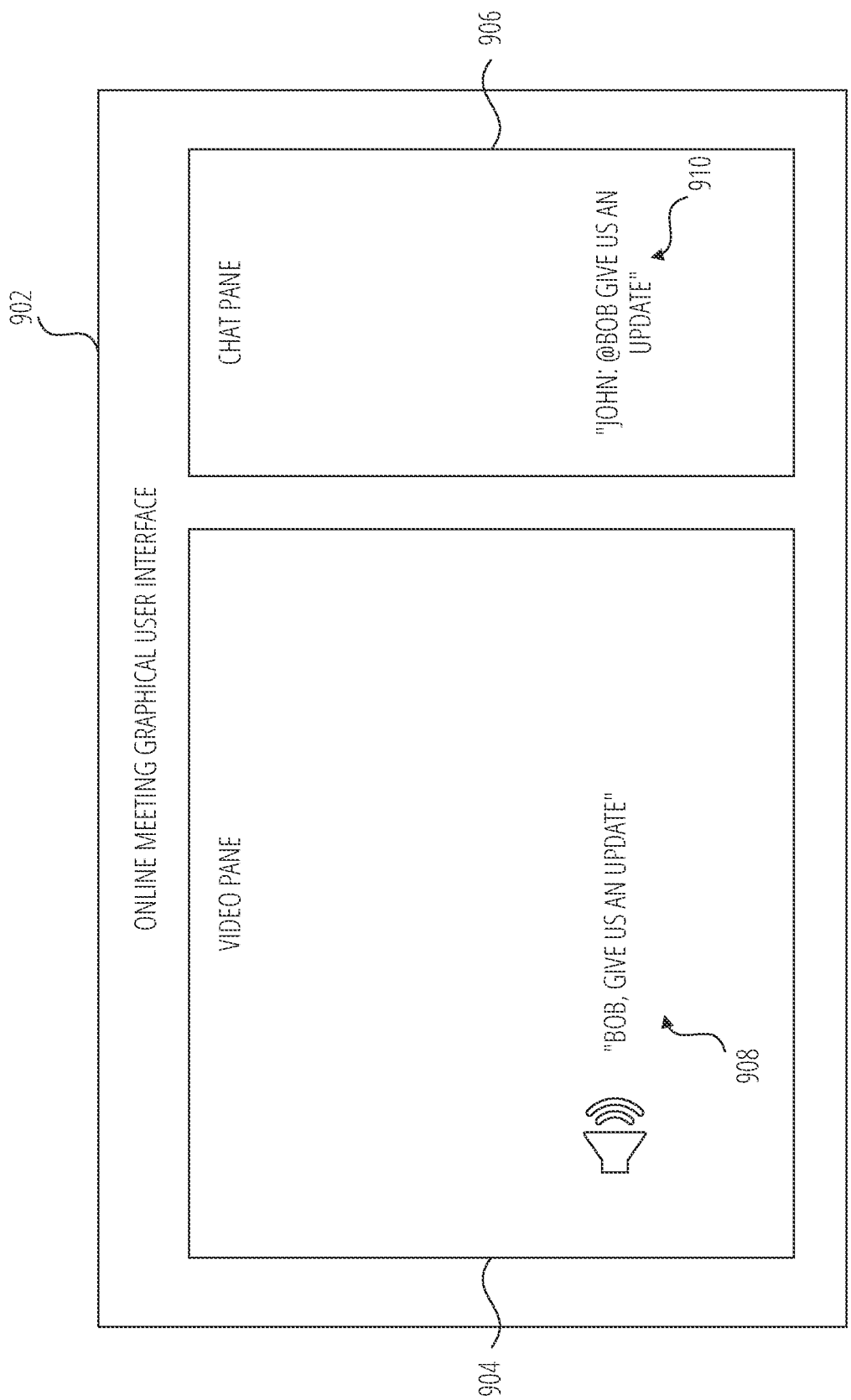
FIG. 9 illustrates a screenshot of an online meeting application graphical user interface in accordance with one example embodiment.

FIG. 9 illustrates a screenshot of an online meeting graphical user interface 902 in accordance with one example embodiment. The online meeting graphical user interface 902 depicts a video pane 904 and chat pane 906. The video pane 904 depicts video stream from the client devices of the attendees. In one example, the video pane 904 provides audio data 908 originating from audio stream; the audio data is not displayed in the video pane 904. The chat pane 906 depicts the enhanced chat message 910 (and chat messages during the session).

Figure 10:
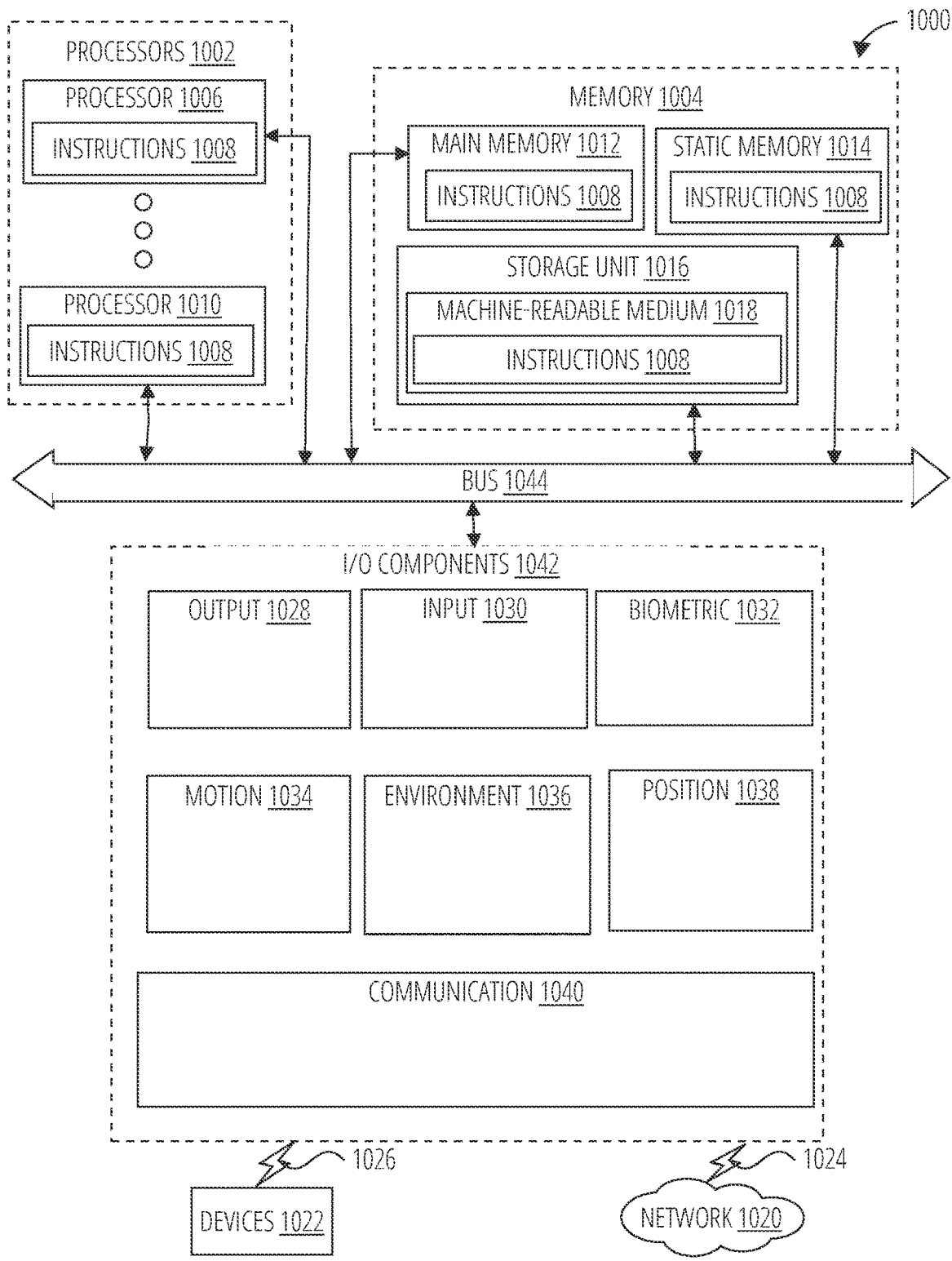
FIG. 10 is a diagrammatic representation of a machine in the form of a computer system within which a set of instructions may be executed for causing the machine to perform any one or more of the methodologies discussed herein, according to an example embodiment.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein.

The machine 1000 may include processors 1002, memory 1004, and I/O components 1042, which may be configured to communicate with each other via a bus 1044. In an example embodiment, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an ASIC, a Radio-Frequency Integrated Circuit (RFIC), another Processor, or any suitable combination thereof) may include, for example, a Processor 1006 and a Processor 1010 that execute the instructions 1008. The term "Processor" is intended to include multi-core Processors that may comprise two or more independent Processors (sometimes referred to as "cores") that may execute instructions contemporaneously. Although FIG. 10 shows multiple processors 1002, the machine 1000 may include a single Processor with a single core, a single Processor with multiple cores (e.g., a multi-core Processor), multiple Processors with a single core, multiple Processors with multiples cores, or any combination thereof.

The memory 1004 includes a main memory 1012, a static memory 1014, and a storage unit 1016, both accessible to the processors 1002 via the bus 1044. The main memory 1004, the static memory 1014, and storage unit 1016 store the instructions 1008 embodying any one or more of the methodologies or functions described herein. The instructions 1008 may also reside, completely or partially, within the main memory 1012, within the static memory 1014, within machine-readable medium 1018 within the storage unit 1016, within at least one of the processors 1002 (e.g., within the Processor's cache memory), or any suitable combination thereof, during execution thereof by the machine 1000.

The I/O components 1042 may include a wide variety of Components to receive input, provide output, produce output, transmit information, exchange information, capture measurements, and so on. The specific I/O components 1042 that are included in a particular machine will depend on the type of machine. For example, portable machines such as mobile phones may include a touch input device or other such input mechanisms, while a headless server machine will likely not include such a touch input device. It will be appreciated that the I/O components 1042 may include many other Components that are not shown in FIG. 10. In various example embodiments, the I/O components 1042 may include output components 1028 and input components 1030. The output components 1028 may include visual Components (e.g., a display such as a plasma display panel (PDP), a light emitting diode (LED) display, a liquid crystal display (LCD), a projector, or a cathode ray tube (CRT)), acoustic Components (e.g., speakers), haptic Components (e.g., a vibratory motor, resistance mechanisms), other signal generators, and so forth. The input components 1030 may include alphanumeric input Components (e.g., a keyboard, a touch screen configured to receive alphanumeric input, a photo-optical keyboard, or other alphanumeric input Components), point-based input Components (e.g., a mouse, a touchpad, a trackball, a joystick, a motion sensor, or another pointing instrument), tactile input Components (e.g., a physical button, a touch screen that provides location and/or force of touches or touch gestures, or other tactile input Components), audio input Components (e.g., a microphone), and the like.

In further example embodiments, the I/O components 1042 may include biometric components 1032, motion components 1034, environmental components 1036, or position components 1038, among a wide array of other Components. For example, the biometric components 1032 include Components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1034 include acceleration sensor Components (e.g., accelerometer), gravitation sensor Components, rotation sensor Components (e.g., gyroscope), and so forth. The environmental components 1036 include, for example, illumination sensor Components (e.g., photometer), temperature sensor Components (e.g., one or more thermometers that detect ambient temperature), humidity sensor Components, pressure sensor Components (e.g., barometer), acoustic sensor Components (e.g., one or more microphones that detect background noise), proximity sensor Components (e.g., infrared sensors that detect nearby objects), gas sensors (e.g., gas detection sensors to detection concentrations of hazardous gases for safety or to measure pollutants in the atmosphere), or other Components that may provide indications, measurements, or signals corresponding to a surrounding physical environment. The position components 1038 include location sensor Components (e.g., a GPS receiver Component), altitude sensor Components (e.g., altimeters or barometers that detect air pressure from which altitude may be derived), orientation sensor Components (e.g., magnetometers), and the like.

Communication may be implemented using a wide variety of technologies. The I/O components 1042 further include communication components 1040 operable to couple the machine 1000 to a network 1020 or devices 1022 via a coupling 1024 and a coupling 1026, respectively. For example, the communication components 1040 may include a network interface Component or another suitable device to interface with the network 1020. In further examples, the communication components 1040 may include wired communication Components, wireless communication Components, cellular communication Components, Near Field Communication (NFC) Components, Bluetooth® Components (e.g., Bluetooth® Low Energy), Wi-Fi® Components, and other communication Components to provide communication via other modalities. The devices 1022 may be another machine or any of a wide variety of peripheral devices (e.g., a peripheral device coupled via a USB).

Moreover, the communication components 1040 may detect identifiers or include Components operable to detect identifiers. For example, the communication components 1040 may include Radio Frequency Identification (RFID) tag reader Components, NFC smart tag detection Components, optical reader Components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code. UCC RSS-2D bar code, and other optical codes), or acoustic detection Components (e.g., microphones to identify tagged audio signals). In addition, a variety of information may be derived via the communication components 1040, such as location via Internet Protocol (IP) geolocation, location via Wi-Fi® signal triangulation, location via detecting an NFC beacon signal that may indicate a particular location, and so forth.

The various memories (e.g., memory 1004, main memory 1012, static memory 1014, and/or memory of the processors 1002) and/or storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed embodiments.

The instructions 1008 may be transmitted or received over the network 1020, using a transmission medium, via a network interface device (e.g., a network interface Component included in the communication components 1040) and using any one of a number of well-known transfer protocols (e.g., hypertext transfer protocol (HTTP)). Similarly, the instructions 1008 may be transmitted or received using a transmission medium via the coupling 1026 (e.g., a peer-to-peer coupling) to the devices 1022.

Although an overview of the present subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the present subject matter may be referred to herein, individually or collectively, by the term "invention" merely for convenience and without intending to voluntarily limit the scope of this application to any single invention or present concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

Examples

Example 1 is a computer-implemented method performed by an accessibility tool (128), the method comprising: accessing (802), in real-time, audio data of a session of an online meeting application (120); identifying (804) a target user, a speaking user, and a task based on the audio data, the speaking user indicating the task assigned to the target user in the audio data; generating (806) a message (318) that identifies the speaking user, the target user, and the task, the message (318) including textual content; and displaying (808) the message (318) in a chat pane (906) of a graphical user interface (902) of the online meeting application (120) during the session.

Example 2 includes example 1, wherein the identifying further comprises: accessing meeting attributes of the session; identifying a plurality of invitees and a plurality of attendees based on the meeting attributes, the plurality of invitees being invited to the session, the plurality of attendees attending the session; detecting, in the audio data, that a first attendee of the plurality of attendees identified a second attendee of the plurality of attendees, the first attendee including the speaking user, the second attendee including the target user; and in response to detecting that the first attendee identified the second attendee, monitoring the audio data for the task indicated by the first attendee.

Example 3 includes example 1, wherein the identifying further comprises: accessing meeting attributes of the session; identifying a plurality of invitees and a plurality of attendees based on the meeting attributes, the plurality of invitees being invited to the session, the plurality of attendees attending the session; detecting, in the audio data, that a first attendee of the plurality of attendees identified a user identifier, the first attending including the speaking user; detecting that the user identifier is associated with a second attendee of the plurality of attendees and a third attendee of the plurality of attendees; identifying a context of a portion of the audio data of the first attendee; identifying the second attendee based on the context; and in response to identifying the second attendee, assigning the second attendee as the target user.

Example 4 includes example 3, comprising: identifying a profile of the first attendee, second attendee, and third attendee; determining a frequency of communications between the first attendee, second attendee, and third attendee, wherein identifying the second attendee is based on the frequency of communications.

Example 5 includes example 4, wherein the frequency of communications comprises audio communication between the first attendee, second attendee, and third attendee on the online meeting application during the session.

Example 6 includes example 3, comprising: in response to detecting that the user identifier is associated with the second attendee and the third attendee, querying the first attendee to confirm an identification of the second attendee or third attendee: and receiving a confirmation of the identification of the second attendee, wherein the context comprises a confirmation of the identification of the second attendee.

Example 7 includes example 1, comprising: accessing meeting attributes of the session; identifying a plurality of invitees and a plurality of attendees based on the meeting attributes, the plurality of invitees being invited to the session, the plurality of attendees attending the session; detecting, in the audio data, that a first attendee of the plurality of attendees identified a first invitee of the plurality of invitees, the first attendee including the speaking user, the first invitee including the target user, wherein the plurality of attendees does not include the first invitee; and in response to detecting that the first attendee identified the first invitee, monitoring the audio data for the task indicated by the speaking user.

Example 8 includes example 7, comprising: communicating the message to the first invitee using a communication application distinct from the online meeting application.

Example 9 includes example 1, 2, or 7, comprising: accessing a task application of the target user; and assigning the task to the target user in the task application.

Example 10 includes example 1, 2, or 7, comprising: detecting that the session has terminated; in response to detecting that the session has terminated, generating a report that identifies the speaking user, the target user, and the task; and sending the report to the target user and the speaking user.

Example 11 includes example 1, wherein the online meeting application comprises a first data stream and a second data stream, the first data stream comprising a combination of video and audio data, the second data stream comprising chat data, a content of the first data stream operating independently from a content of the second data stream, wherein the online meeting application comprises a graphical user interface that includes a first pane and a second pane, the first pane depicting the first data stream in real-time, the second pane depicting the second data stream in real-time, and wherein the message is displayed in the second pane.

Example 12 includes example 11, comprising: pinning the message in the second pane such that the message remains visible in the second pane during the session.

Example 13 includes example 11, comprising: visually emphasizing the message in the second pane.

Example 14 is a computer-readable storage medium, the computer-readable storage medium including instructions that when executed by a computer, cause the computer to perform operations implementing the method of any of example 1 to example 13.

Example 15 is a computing apparatus comprising: a processor; and a memory storing instructions that, when executed by the processor, configure the apparatus to: access audio data of a session of an online meeting application; identify a target user, a speaking user, and a task based on the audio data, the speaking user indicating the task assigned to the target user in the audio data; generate a message that identifies the speaking user, the target user, and the task; and display the message in a chat pane of a graphical user interface of the online meeting application during the session.

What is claimed is:

1. A computer-implemented method performed by an accessibility tool (128), the method comprising:
    accessing (802), in real-time, audio data of a session of an online meeting application (120);
    identifying (804) a target user, a speaking user, and a task based on the audio data, the speaking user indicating the task assigned to the target user in the audio data;
    generating (806) a message (318) that identifies the speaking user, the target user, and the task, the message (318) including textual content;
    causing display (808) of the message (318) in a chat pane (906) of a graphical user interface (902) of the online meeting application (120) during the session; and
    in response to generating the message, sending an email message to the target user using an email communication application that is separate from the online meeting application the email message identifying the speaking user, the target user, and the task.

2. The method of claim 1, wherein the identifying further comprises:
    accessing meeting attributes of the session;
    identifying a plurality of invitees and a plurality of attendees based on the meeting attributes, the plurality of invitees being invited to the session, the plurality of attendees attending the session;
    detecting, in the audio data, that a first attendee of the plurality of attendees identified a second attendee of the plurality of attendees, the first attendee including the speaking user, the second attendee including the target user; and
    in response to detecting that the first attendee identified the second attendee, monitoring the audio data for the task indicated by the first attendee.

3. The method of claim 1, wherein the identifying further comprises:
    accessing meeting attributes of the session;
    identifying a plurality of invitees and a plurality of attendees based on the meeting attributes, the plurality of invitees bang invited to the session, the plurality of attendees attending the session;
    detecting, in the audio data, that a first attendee of the plurality of attendees identified a user identifier, the first attending including the speaking user;
    detecting that the user identifier is associated with a second attendee of the plurality of attendees and a third attendee of the plurality of attendees;
    identifying a context of a portion of the audio data of the first attendee;

identifying the second attendee based on the context; and
in response to identifying the second attendee, assigning the second attendee as the target user.

4. The method of claim 3, comprising:
identifying a profile of the first attendee, second attendee, and third attendee;
determining a frequency of communications between the first attendee, second attendee, and third attendee,
wherein identifying the second attendee is based on the frequency of communications.

5. The method of claim 4, wherein the frequency of communications comprises audio communication between the first attendee, second attendee, and third attendee on the online meeting application during the session.

6. The method of claim 3, comprising:
in response to detecting that the user identifier is associated with the second attendee and the third attendee, querying the first attendee to confirm an identification of the second attendee or third attendee; and
receiving a confirmation of the identification of the second attendee, wherein the context comprises a confirmation of the identification of the second attendee.

7. The method of claim 1, comprising:
accessing meeting attributes of the session;
identifying a plurality of invitees and a plurality of attendees based on the meeting attributes, the plurality of invitees being invited to the session, the plurality of attendees attending the session;
detecting, in the audio data, that a first attendee of the plurality of attendees identified a first invitee of the plurality of invitees, the first attendee including the speaking user, the first invitee including the target user, wherein the plurality of attendees does not include the first invitee; and
in response to detecting that the first attendee identified the first invitee, monitoring the audio data for the task indicated by the speaking user.

8. The method of claim 7, comprising:
communicating the message to the first invitee using a communication application distinct from the online meeting application.

9. The method of claim 1, comprising:
accessing a task application of the target user; and
assigning the task to the target user in the task application.

10. The method of claim 1, comprising:
detecting that the session has terminated;
in response to detecting that the session has terminated, generating a report that identifies the speaking user, the target user, and the task; and
sending the report to the target user and the speaking user.

11. The method of claim 1, wherein the online meeting application comprises a first data stream and a second data stream, the first data stream comprising a combination of video and audio data, the second data stream comprising chat data; a content of the first data stream operating independently from a content of the second data stream,
wherein the online meeting application comprises a graphical user interface that includes a first pane and a second pane, the first pane depicting the first data stream in real-time, the second pane depicting the second data stream in real-time, and
wherein the message is displayed in the second pane.

12. The method of claim 11, comprising:
pinning the message in the second pane such that the message remains visible in the second pane during the session.

13. The method of claim 11, comprising:
visually emphasizing the message in the second pane.

14. A non-transitory computer-readable storage medium, the non-transitory computer-readable storage medium including instructions that when executed by a computer, cause the computer to perform operations comprising:
accessing, in real-time, audio data of a session of an online meeting application;
identifying a target user, a speaking user, and a task based on the audio data, the speaking user indicating the task assigned to the target user in the audio data;
generating a message that identifies the speaking user, the target user, and the task, the message including textual content;
causing display of the message in a chat pane of a graphical user interface of the online meeting application during the session; and
in response to generating the message, sending an email message to the target user using an email communication application that is separate from the online meeting application, the email message identifying the speaking user, the target user, and the task.

15. A computing apparatus comprising:
a processor; and
a memory storing instructions that, when executed by the processor, configure the apparatus to perform operations comprising:
accessing audio data of a session of an online meeting application;
identifying a target user, a speaking user, and a task based on the audio data, the speaking user indicating the task assigned to the target user in the audio data;
generating a message that identifies the speaking user, the target user, and the task;
causing display of the message in a chat pane of a graphical user interface of the online meeting application during the session; and
in response to generating the message, sending an email message to the target user using an email communication application that is separate from the online meeting application, the email message identifying the speaking user, the target user, and the task.

16. The computing apparatus of claim 15, wherein the identifying further comprises:
accessing meeting attributes of the session;
identifying a plurality of invitees and a plurality of attendees based on the meeting attributes, the plurality of invitees being invited to the session, the plurality of attendees attending the session;
detecting, in the audio data, that a first attendee of the plurality of attendees identified a second attendee of the plurality of attendees, the first attendee including the speaking user, the second attendee including the target user; and
in response to detecting that the first attendee identified the second attendee, monitoring the audio data for the task indicated by the first attendee.

17. The computing apparatus of claim 15, wherein the identifying further comprises:
accessing meeting attributes of the session;
identifying a plurality of invitees and a plurality of attendees based on the meeting attributes, the plurality of invitees being invited to the session, the plurality of attendees attending the session;
detecting, in the audio data, that a first attendee of the plurality of attendees identified a user identifier, the first attending including the speaking user;

detecting that the user identifier is associated with a second attendee of the plurality of attendees and a third attendee of the plurality of attendees;

identifying a context of a portion of the audio data of the first attendee;

identifying the second attendee based on the context; and in response to identifying the second attendee, assigning the second attendee as the target user.

18. The computing apparatus of claim 17, wherein the operations further comprises:

identifying a profile of the first attendee, second attendee, and third attendee;

determining a frequency of communications between the first attendee, second attendee, and third attendee, wherein identifying the second attendee is based on the frequency of communications.

19. The computing apparatus of claim 18, wherein the frequency of communications comprises audio communication between the first attendee, second attendee, and third attendee on the online meeting application during the session.

20. The computing apparatus of claim 17, wherein the operations further comprises:

in response to detecting that the user identifier is associated with the second attendee and the third attendee, querying the first attendee to confirm an identification of the second attendee or third attendee; and receiving a confirmation of the identification of the second attendee, wherein the context comprises a confirmation of the identification of the second attendee.

\* \* \* \* \*